US009440698B2

(12) United States Patent
Dadoosh et al.

(10) Patent No.: US 9,440,698 B2
(45) Date of Patent: Sep. 13, 2016

(54) FOLDABLE MOTORIZED SCOOTER

(71) Applicant: GREEN RIDE LTD., Haifa (IL)

(72) Inventors: Ori Dadoosh, Herzliya (IL); Doobie Abraham, Haifa (IL); Eliyahu Dadosh, Herzliya (IL); Liran Nackache, Haifa (IL)

(73) Assignee: Green Ride Ltd, Haifa (IL)

( * ) Notice: Subject to any disclaimer, the term of this patent is extended or adjusted under 35 U.S.C. 154(b) by 0 days.

(21) Appl. No.: 14/647,416

(22) PCT Filed: Nov. 26, 2013

(86) PCT No.: PCT/IL2013/050978
§ 371 (c)(1),
(2) Date: May 26, 2015

(87) PCT Pub. No.: WO2014/080412
PCT Pub. Date: May 30, 2014

(65) Prior Publication Data
US 2015/0321722 A1    Nov. 12, 2015

Related U.S. Application Data

(60) Provisional application No. 61/729,776, filed on Nov. 26, 2012.

(51) Int. Cl.
| B62K 15/00 | (2006.01) |
| B62K 11/14 | (2006.01) |
| B62J 25/00 | (2006.01) |
| B60L 11/18 | (2006.01) |
| H02J 7/00 | (2006.01) |
| B62K 3/00 | (2006.01) |
| B62H 3/00 | (2006.01) |

(52) U.S. Cl.
CPC .......... *B62K 15/006* (2013.01); *B60L 11/1816* (2013.01); *B60L 11/1838* (2013.01); *B62J 25/00* (2013.01); *B62K 3/002* (2013.01); *B62K 11/14* (2013.01); *B62K 15/00* (2013.01); *H02J 7/0042* (2013.01); *B62H 2003/005* (2013.01); *B62K 2202/00* (2013.01); *B62K 2204/00* (2013.01)

(58) Field of Classification Search
CPC . B62K 15/00; B62K 15/006; B62K 2202/00
USPC ........................................................ 180/208
See application file for complete search history.

(56) References Cited

U.S. PATENT DOCUMENTS

| D658,724 S | * | 5/2012 | Epstein ........................ D21/423 |
| D736,325 S | * | 8/2015 | Daddoosh .................... D21/423 |

(Continued)

FOREIGN PATENT DOCUMENTS

| DE | 29715152 U1 | * | 11/1997 | ............ B62K 3/002 |
| DE | 102010027997 A1 | * | 3/2011 | ............ B62K 3/002 |

(Continued)

*Primary Examiner* — Ruth Ilan
(74) *Attorney, Agent, or Firm* — Guy Levi; The IP Law Firm of Guy Levi, LLC

(57) ABSTRACT

The disclosure is directed to a foldable motorized scooter having at least one front wheel and at least one rear wheel, configured to operate between an extended rideable position where the front wheel and the rear wheel are aligned along a longitudinal axis, and a folded stowed position wherein the at least one front wheel and the at least one rear wheel are concentrically parallel to each other along a transverse axis, the foldable motorized scooter equipped with a rechargeable power source.

8 Claims, 11 Drawing Sheets

(56) References Cited

U.S. PATENT DOCUMENTS

| | | | |
|---|---|---|---|
| D744,047 S * | 11/2015 | Daddoosh | D21/423 |
| 2005/0173175 A1 * | 8/2005 | Lee | B62K 15/008 180/208 |
| 2009/0115167 A1 * | 5/2009 | Chin | B62K 11/10 280/639 |

FOREIGN PATENT DOCUMENTS

| | | | | |
|---|---|---|---|---|
| DE | WO 2015176946 A1 | * | 11/2015 | B62K 3/002 |
| DK | WO 2010136038 A1 | * | 12/2010 | B62K 3/002 |
| FR | 2987813 A1 | * | 9/2013 | B62K 15/00 |
| KR | 101209930 B1 | * | 12/2012 | B62K 3/002 |
| NL | EP 2106993 A1 | * | 10/2009 | B62K 11/10 |

\* cited by examiner

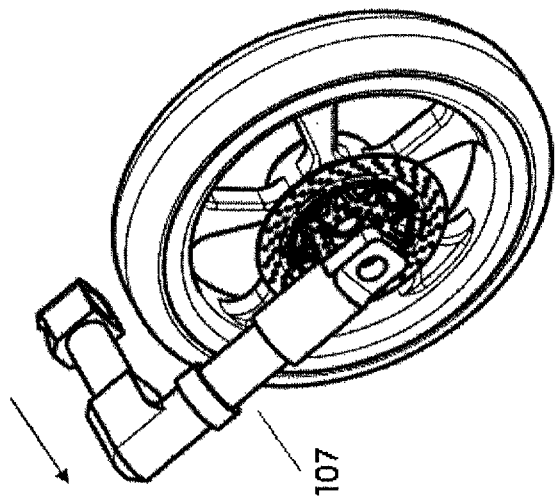
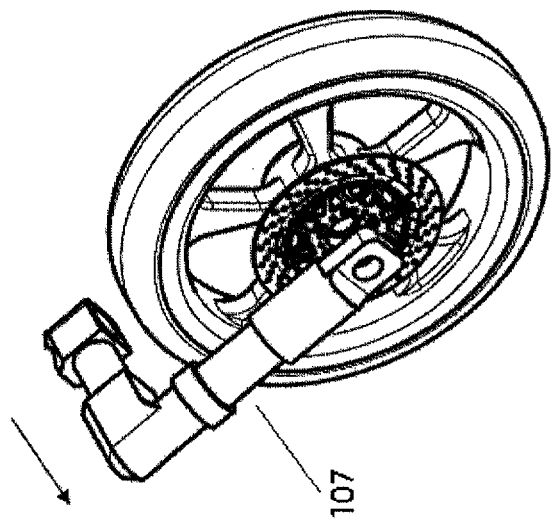
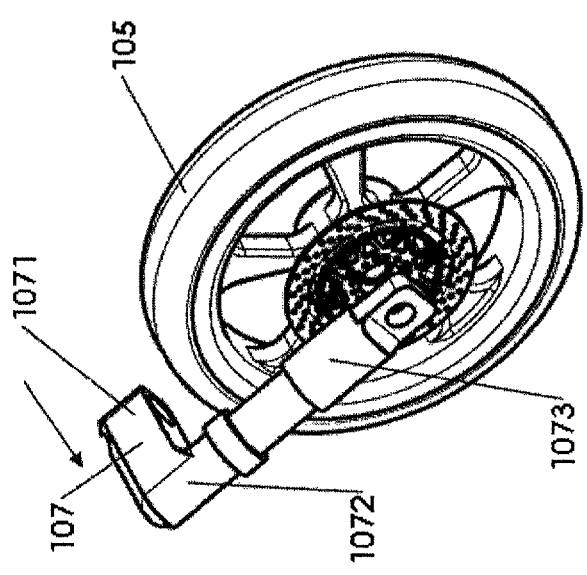

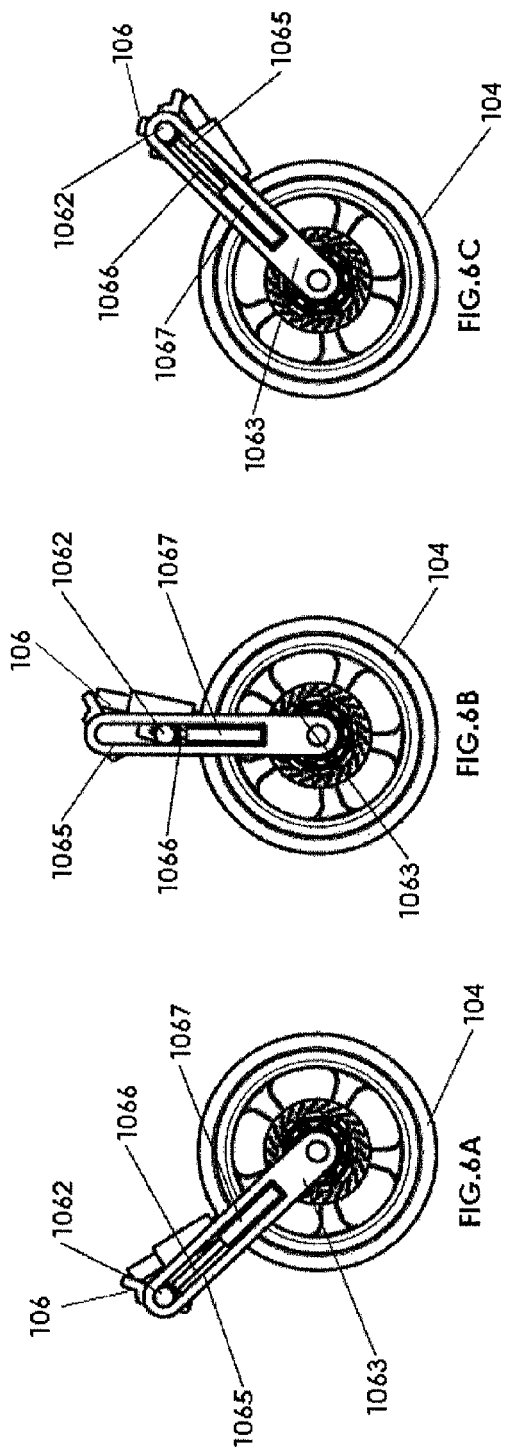
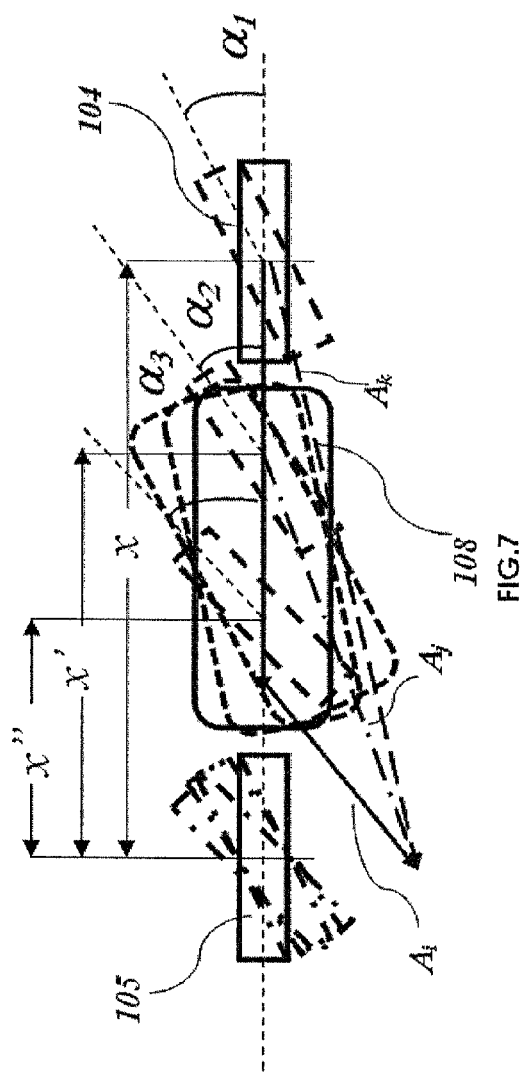

FOLDABLE MOTORIZED SCOOTER

CROSS REFERENCE TO RELATED APPLICATIONS

This patent application is a U.S. National Phase filing of commonly owned PCT Application No. PCT/IL2013/050978, filed Nov. 26, 2013, which claims priority from U.S. Provisional Application No. 61/729,776, filed 26 Nov. 2012 both which are incorporated herein by reference in their entirety.

BACKGROUND

The disclosure generally relates to a personal mobility solution. Specifically, the disclosure relates to a foldable motorized scooter with rechargeable, interchangeable batteries.

In 2007, 50% (3.5 billion) of global population lived in cities, and by 2030, 5 billion people (60%) are projected to live in urban areas. Traffic congestion wastes time of all those who are caught in it and the resultant inability to forecast accurate travel time leads to substantial economical inefficiencies. Moreover, traffic congestion causes substantial amount of vehicular idling, contributing to the emission of fumes and pollution.

Congestion pricing exercised in several cities, for example, London, Stockholm and Edinburgh attempt to alleviate some of the urban congestion, but mainly target out-of-town commuters traveling into the center of the urban areas. In major cities, a trend started developing where the ownership of vehicles has reached saturation and the average number of miles traveled in these cities began to actually decline. One possible explanation provided states that as the time for commute into the urban centers increases, the draw of the suburbs decreases and more people migrate back to the cities. Likewise, as the urban centers develop, the distance traveled by urban commuters from their residence to their place of employment, is expected to rise.

Accordingly, a need arises for means for personal urban mobility that can be self-propelled, yet compact and light enough to be carried into and onto public transportation, and at the same time be capable of transporting an adult person an acceptable distance at an effective, manageable and safe speed.

SUMMARY

Disclosed, in various embodiments, are personal mobility solutions. Specifically, the disclosure relates to foldable motorized scooters, with a rechargeable power source.

In an embodiment, provided herein is a foldable motorized scooter having at least one front wheel and at least one rear wheel, configured to operate between an extended rideable position where the front wheel and the rear wheel are aligned along a longitudinal axis, and a folded stowed position wherein the at least one front wheel and the at least one rear wheel are concentrically parallel to each other along a transverse axis.

In another embodiment, provided herein is a docking station, configured to engage the foldable scooter provided herein, comprising a station-scooter interface (SSI), configured to operably couple the scooter, charge the power source of the scooter, and optionally provide data communication.

In an embodiment, provided herein is a method of transforming a scooter from an extended rideable position to a folded stowed position comprising the steps of: providing a foldable motorized scooter, having at least one front wheel and at least one rear wheel, configured to operate between an extended rideable position where the front wheel and the rear wheel are aligned along a longitudinal axis, and a folded stowed position wherein the at least one front wheel and the at least one rear wheel are concentrically parallel to each other along a transverse axis; and initiating a folding sequence, wherein the scooter is automatically transformed from the extended rideable position where the at least two wheels are aligned one behind the other in a same plane, to the folded stowed position, where the at least two wheels are disposed in concentric parallel planes, with at least one wheel in one of two or more parallel planes, resulting in the scooter being in the folded stowed position.

In yet another embodiment, provided herein is a method for operating a foldable self-powered vehicle at least two-wheeled having an extended rideable position and a folded rollable position, the method comprising the steps of: disposing the at least two wheels one behind the other in a same plane when in the extended position; disposing the at least two wheels in concentric parallel disposition when in the folded position, with at least one wheel in one of at least two parallel planes, and operating the vehicle in response to command for passing automatically into one of the extended position and/or the folded position.

These and other features of the foldable motorized scooter rechargeable with a dedicated docking station, will become apparent from the following detailed description when read in conjunction with the drawings, which are exemplary, not limiting, and wherein like elements are numbered alike in several figures.

BRIEF DESCRIPTION OF THE FIGURES

For a better understanding of the foldable motorized scooter, with regard to the embodiments thereof, reference is made to the accompanying drawings, in which like numerals designate corresponding elements or sections throughout and in which:

FIG. 5A, is a schematic illustration of an embodiment of the lateral extension of the front wheel axle assembly along the folding progression illustrated in FIGS. 4A-C, showing beginning, with mid-way shown in FIG. 5C and at the end in FIG. 5C;

FIG. 6A, is a schematic illustration of an embodiment of the rear wheel position during the lateral extension of the rear wheel axle assembly along the folding progression illustrated in FIGS. 4A-C, showing beginning, with mid-way shown in FIG. 6B and at the end in FIG. 6C;

FIG. 7, is a schematic illustration of the scooter's rotation during lateral axle extension through the folding progression as a function of the extension initiation point;

Figure 1:
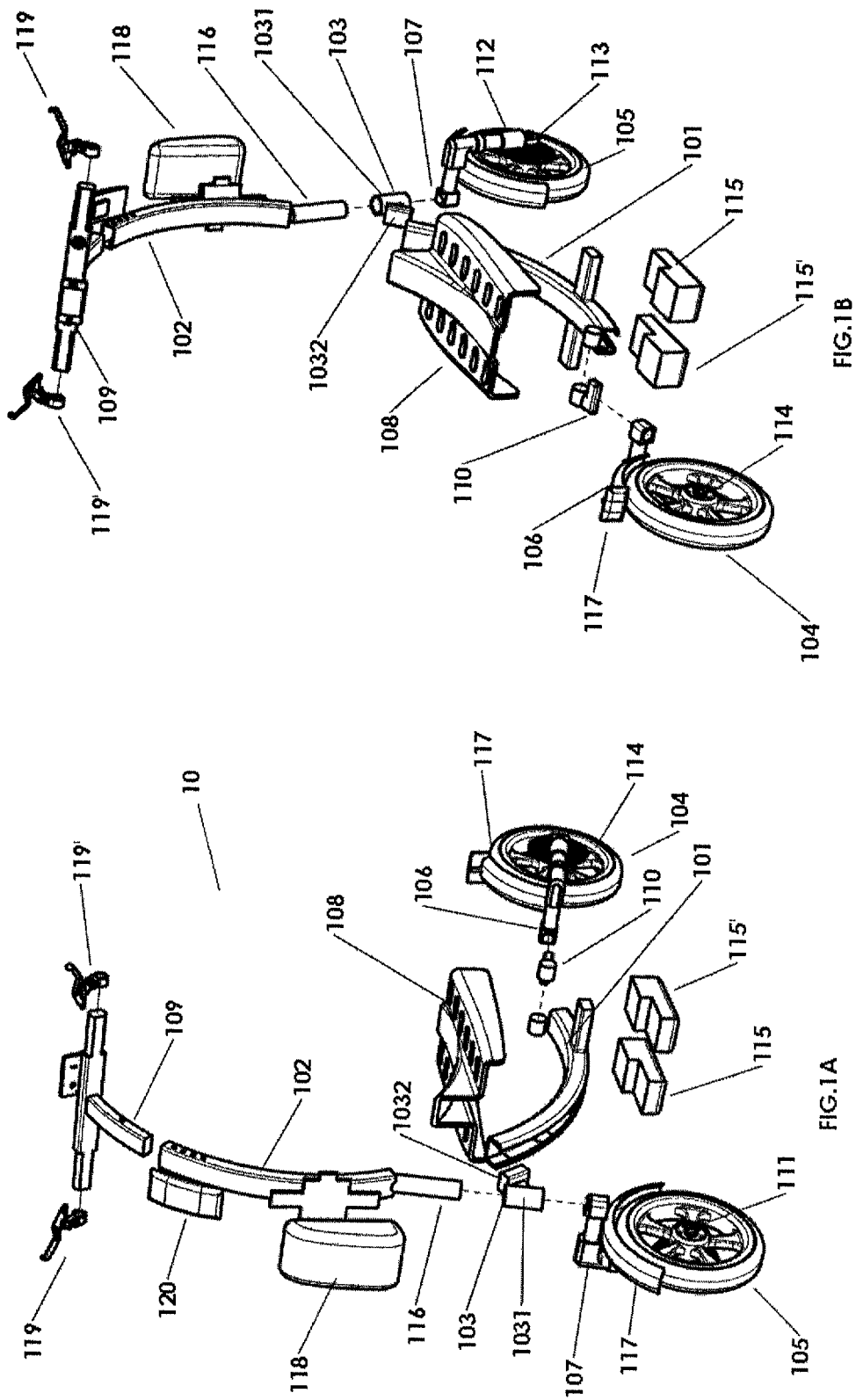
FIG. 1A shows an exploded view of the front and back in FIG. 1B, of an embodiment of the foldable motorized scooter.

As would be understood by a person skilled in the art, there can be many designs possible for the foldable motorized scooter described herein that will achieve the same functionality and the figures provided for the purpose of illustrating the technology.

DESCRIPTION

Provided herein are personal urban mobility solutions. Specifically, provided herein are foldable motorized scooters, rechargeable with a dedicated docking station.

In an embodiment, the foldable motorized scooter can be characterized by an automatic folding system, advanced technology, fashionable design, and user friendly interface. The foldable motorized scooter can be highly efficient and reliable, having charging range of about 10 to 150 km and can carry up to two adult passengers under most road conditions. The foldable motorized scooter can weigh up to about 25 kg (50 lbs.).

Accordingly, and in an embodiment, provided herein is a foldable motorized scooter having at least one front wheel and at least one rear wheel, configured to operate between an extended rideable position where the front wheel and the rear wheel are aligned along a longitudinal axis (in other words, the Y axis of an orthogonal coordinate system), and a folded stowed position wherein the at least one front wheel and the at least one rear wheel are concentrically parallel to each other along a transverse axis (in other words, the axis perpendicular to the longitudinal axis, or the X-axis in an orthogonal coordinate system). The foldable motorized scooter can be configured to operate automatically between an extended rideable position and a folded stowed position, an comprise: an arcuate C-shaped beam member having an open proximal end and a distal end; a rear wheel coupled to a rear axle assembly on one side only, wherein the rear axle assembly has a proximal end that is hingedly coupled to the distal end of the arcuate C-shaped beam member and a distal end rotatably coupled to the rear wheel; a linking member, comprising a front axle-receiving shell coupled to a flared guiding knob, the flared guiding knob slidably coupled to the open proximal end of the arcuate C-shaped beam member; an arcuate hollow beam member, having an open proximal end and a distal end coupled to a proximal end of a front axle, configured to rotatably couple to the axle-receiving shell of the linking member; a front wheel coupled to a front axle assembly only on the side opposite the rear wheel, wherein the axle assembly has a proximal end that is hingedly rotatably coupled to the distal end of the axle pole of the arcuate hollow beam member; a T-shaped handle bar, having an arcuate leg configured to be inserted into the open proximal end of the arcuate hollow beam member; and a driver operably coupled to the front wheel, the rear wheel, or both, wherein the arcuate C-shaped beam member is configured to slide over the flared guiding base of the linking member and around the arcuate hollow beam member. The reference throughout the disclosure to "a front wheel coupled to a front axle assembly only on the side opposite the rear wheel" is intended to indicate that if the rear wheel axle is coupled to, for example, the left side of the wheel, the front wheel axle will be coupled to the wheel on the right side, and vice-a-versa, if the rear wheel axle is coupled in another example, to the right side of the wheel, the front wheel axle will be coupled to the wheel on the left side.

The term "arcuate" refers to a curved surface having a radial are. The radius of curvature may vary, depending on the intended passenger size. In certain embodiment, the arc formed of the arcuate C-shaped beam member, the arcuate hollow beam member, and the arcuate leg of the T-shaped handlebar define an arc with a radius of between about 5 cm and about 80 cm. For example the radius can be between about 10 cm and about 80 cm, or between about 20 cm and about 65 cm, specifically between about 25 cm and about 60 cm, or between about 45 cm and about 60 cm. Likewise, in its extended position, the arc formed of the arcuate C-shaped beam member, the arcuate hollow beam member, and the arcuate leg of the T-shaped handlebar define an arc having a length of between about 40 cm and about 200 cm. For example, the arc formed of the arcuate C-shaped beam member, the arcuate hollow beam member, and the arcuate leg of the T-shaped handlebar can define an arc having a length of about 120 cm to about 180 cm. Also, the arcuate C-shaped beam member, the arcuate hollow beam member, and the arcuate leg of the T-shaped handlebar can define an arc with an angle between about 150' and about 180'. The size determination can depend on age of the intended user.

Similarly, the motorized foldable scooter can be a kick scooter equipped with a driver to facilitate the automatic folding and unfolding of the arcs described herein.

Likewise, the term "C-shaped" refers to a conventional C-shaped as well as a C-shaped which is a reversed or mirror image of the conventional C-shape. The cross section of the C-shaped beam described herein is shown for example, in FIG. 1B element 101. Generally, the term "C-shaped" refers to a cross section of a beam that can be rectangular wherein; a portion along one of the long sides, or short side is removed, creating an opening. Likewise, C-shaped can refer to a circular beam where a portion of the circumference is removed to provide the "C-shape". Accordingly, in an embodiment, the arcuate hollow member, arcuate leg of T-shaped handlebar and the C-shaped arcuate member have a substantially circular cross-section, or, in another embodiment, a substantially rectangular cross section. A person skilled in the art would readily recognize that the cross section of the beams can be of a various cross section shape without departing from the scope and concept provided herein. In addition, the term "slidably coupled" is used in its broadest sense to refer to elements which are coupled in a way that permits one element to slide or translate with respect to another element. Also, the term "rotatably coupled" refers to circumstances where two components are attached to each other, perhaps via one or more other components, such that one or both of the two components can rotate.

The foldable motorized scooter can be constructed from any material capable of carrying the loads and torsions required from the operation of the foldable motorized scooter. Possible materials can be for example, aluminum, steel, titanium and the like. The driver for the foldable motorized scooter can be for example, a reversible and/or controllable hub motor. A hub motor is a type of motor where the exterior of the motor rotates while the inner portion is fixed. A hub motor can be advantageous because it can be attached to a wheel and can drive the wheel without an axle, drive shaft, transmission, or other components of a typical drive train. Elimination of a drive train can greatly reduce the weight of the foldable motorized scooter. In an embodiment, the hub motor's casing can be designed to be integrated with the foldable motorized scooter's wheel rims, spokes and/or axle.

In addition, the hub motor (or, a separate driver motor can be operably coupled to the arcuate C-shaped beam and power the folding mechanism either directly, or using, for example, wires, pulleys, gears (e.g., caterpillar) and the like. In an embodiment, an actuator positioned on the handlebar initiates folding of the foldable motorized scooter. As folding is initiated (see e.g., FIG. 4), the front wheel can be locked (in other, breaks can be applied) thus anchoring the scooter, a locking pin positioned at the proximal end of the C-shaped arcuate beam locking the beam to a guiding element can be opened and the hub motor, coupled to the rear wheel drives the C-shaped arcuate beam forward while linear actuators positioned in the cross bar of the rear wheel axle assembly and front wheel axle assembly shift to their extended position, causing the wheels to realign in a parallel position at the end of the folding process. Each of the actuators described herein, can have in another embodiment, a manual override that can be instrumental in folding and/or unfolding the foldable motorized scooter upon loss of power or other emergency circumstances.

In an embodiment, the term "actuator" refers to any servo-mechanism that supplies and transmits a measured amount of energy for the operation of another mechanism, such as a mechanical linkage, an electromechanical system, an electric motor, a hydraulic mechanism, a pneumatic mechanism, and the like. Likewise, it will be appreciated that any suitable actuator may be used; for example, electric motors may be used for many of the actuators discussed herein. However, other types of actuators can also be used, including pneumatic or hydraulic devices, solenoids or the like, depending upon the particular requirements of the specific task the actuator is to perform.

As used herein, "side axle assembly" refers to an axle attached to the body of the foldable motorized scooter in a single point and NOT through a fork (in other words, the "fork" has only one arm positioned to one side; either right or left, of the wheel)). The side axle assembly can further comprise a shock absorber (e.g., spring, pneumatic, electrorheologic fluid, etc.) coupled to the axle either on the left side of the axle or the right side of the axle when viewed from the front of the foldable motorized scooter. In addition, the side axle assembly can comprise a telescopic cross bar, configured to extend thus creating space between the wheels when the foldable motorized scooter is folded. The telescopic cross bar can be coupled to an actuator (e.g., a linear actuator) which is in communication with the driver (in other words, the hub motor) and/or the processor.

In addition, the foldable motorized scooter described herein, can have more than two wheels and can have three wheels, for example two front wheels and one rear wheel, or in another embodiment, two rear wheels and one front wheel.

The foldable motorized scooter can further comprise a foot board, coupled to the arcuate C-shaped beam disposed such that at the extended position, the flat surface is parallel with the ground. The footboard can have an upper surface and a lower surface. The upper surface can be textured to increase friction between the upper surface and the standing passenger. The upper surface can also define various openings to provide aesthetics as well as reduce the weight of the footboard. The lower surface of the footboard can be configured to receive a rechargeable, interchangeable battery(ies) used to power the driver, the folding mechanism, lights, displays and any central processor used (CPU) in the foldable motorized scooter described. The power source, for example, the rechargeable, interchangeable battery(ies) used to power the driver can be disposed in certain embodiment anywhere on the scooter, so long they can be in electronic communication with the scooter's driver and a recharging power source. In an example, the batteries form an integral part of the front wheel, the rear wheel, or both.

The power source used in the foldable, motorized scooters described can be, for example, rechargeable, exchangeable batteries, which can be configured to support the transport of two adult riders for a distance of between 10 km and 150 km, for example, between about 20 and 60 km. The batteries used can have a short recharging time, for example, 45 minutes to 120 minutes, specifically, about 60 minutes to about 90 minutes, depending on the voltage supplied. The rechargeable, interchangeable battery can be for example, lithium ion battery, or, in another embodiment, the power source can be an energy cell, for example aluminum-air energy cell. The power source can be configured to be charged with a plug-in docketing apparatus, configured to plug in to a wall outlet for example, or to a car charging outlet (lighter outlet), as well as be charged in the docking stations described herein. A person of skill in the art would readily recognize that when possible, other mobile, renewable power sources may be adapted to power the driver for the foldable motorized scooter described herein. Moreover, charging interface stations may be deployed in public transportation vehicles, adapted and configured to charge the batteries when stowed for transportation (e.g., trains, planes, marine vehicles, and busses).

In its extended position, the distance between the center of the front wheel and rear wheel can be between about 50 cm and about 180 cm. For example, the distance between the center of the front wheel and rear wheel can be between about 75 cm and about 150 cm, or between about 80 cm and about 140 cm, specifically, between about 85 cm and about 120 cm, or between about 90 cm and about 120 cm. The height of the foldable motorized scooter, measured from the ground to the handlebar can be between about 75 cm and about 150 cm, specifically, between about 80 cm and about 140 cm.

In addition, the wheels used can have for example, a radius (not including the tires) of between 25 cm and 40 cm, specifically, between 28 cm and 32 cm. Likewise the width of the wheels can be between about 2.5 cm and about 13.0 cm, specifically, about 6.25 cm. Additionally the tire can have an aspect ratio of, for example between about 0.40 (or 40%) to about 0.6 (or 60%), indicating that the sidewall height is 60% of the width of the tire.

The ratios in dimensions between the extended rideable position to the folded stowed position can be configured to be between about 1.0 to about 3.5 for the length; between about 1.0 to about 1.05 for the height; and between about 1.0 to about 0.1.0 for the width. For example, the foldable motorized scooter, when in the folded stowed position, can occupy a rectangular footprint of about 0.4 m by about 0.5 m, and be configured to fit in the aisle between bus seats or train seats. The volume occupied by a box containing the foldable motorized scooter in the stowed position can have, for example dimensions of about 0.4 m by about 0.5 m, by about 1.0 m, configured to fit within the average sedan trunk (or, in other words, boot).

The foldable motorized scooter can comprise a T-shaped handlebar, which can be further equipped with handbrakes and throttle controlling the driver. In addition, the handlebar cross bar can be equipped with a display showing, for example, the charge status of the batteries, speed, distance traveled, remaining time/distance at current usage level or a combination comprising at least one of the foregoing. The display can be coupled to a microprocessor (e.g., a controller), a GPS and the like and be in communication with the driver (in other words the hub motor). Moreover, the handlebar can further comprise various actuators (in other words, buttons), configured to initiate and control the folding mechanism. Moreover, the T-shaped handlebar can further be provided with a docking point for a hand-held device such as, for example, a smartphone, iPad, iPad mini, Nook, Kindle and other tablets or similar devices. The docking point can communicate with the vehicle's processor to provide additional functionality, such as, for example, voice command, OPS navigation narration, alerts, and the like.

The vehicle (for example, a scooter), can further comprise an on-board processor comprising a user interface, a display, volatile and/or non-volatile memory module, executable algorithms on a computer readable media, central processing unit, analog-to-digital and/or digital-to-analog converter(s), a transceiver configured for wireless and/or cellular communication all in electronic communication. The vehicle can further comprise various sensors in electronic communication with the processor. The term "communicate" (and its derivatives e.g., a first component "communicates with" or "is in communication with" a second component) and grammatical variations thereof are used to indicate a structural, functional, mechanical, electrical, optical, or fluidic relationship, or any combination thereof, between two or MOTO components or elements. As such, the fact that one component is said to communicate with a second component is not intended to exclude the possibility that additional components can be present between, and/or operatively associated or engaged with, the first and second components.

The foldable motorized scooter can be recharged using a docking station described herein. Accordingly, in an embodiment, provided herein is a docking station, configured to engage the foldable scooter provided herein, comprising a station-scooter interface (SSI), configured to operably couple the scooter, charge the power source of the scooter, and optionally provide data communication. The docking station, can be configured to engage the foldable scooter described herein, comprising a station-scooter interface (SSI), configured to operably couple the scooter and charge the power source of the scooter. The docking station, can be configured to receive the foldable scooter as described herein, and comprise: a base; a vertical member having a bottom portion coupled to the base; a power source (e.g., a solar panel, or a wind turbine coupled to a top portion of the vertical member) coupled to a charging interface; a station-scooter interface (SSI), configured to operably couple the folded scooter; and a station-user interface (SUI), wherein the power source (e.g., a solar panel) is in electronic communication with the SSI, configured to charge and lock the rechargeable, interchangeable battery. The vertical member can be configured to have a lower portion that is arcuate, with an arc having about the same radius of the arc formed of the arcuate C-shaped beam member, the arcuate hollow beam member, and the arcuate leg of the T-shaped handlebar.

The SSI can comprise an electromagnetic contact point, which can be configured to both secure the foldable motorized scooter to the clocking station, as well as transfer the charge from the power source (e.g., a solar panel) to the batteries. The SSI can likewise be in electronic communication with the electric power supply for the area where it is deployed.

The SUI can be in electronic, wireless, cellular, radio or wired communication with a networked remote facility configured to manage the interface of users with the motorized foldable scooters described herein. For example, the SW can manage the interstitial communication between an end user and the networked remote facility to facilitate the rental of the motorized foldable scooters described herein, including, inter-alia, payment, timekeeping, return of the motorized foldable scooters and other necessary functions. Facilitating such interface may also comprise installing a compatible host application module at a memory of a client's device (e.g., a smartphone, hand-held computer, tablet and the like) in order to thereafter register said client with respect to the rental service provider by providing at least one user credential (e.g., an ID number, credit/debit card number, a qualifying descriptor, or a combination comprising at least one of the foregoing) to the rental service provider; configuring said device in association with the rental service provider; and managing interstitial communication associated with payment transfer between the client and the rental service provider; displaying a plurality of locations having available rental units; and optionally providing an unlocking code. The host application may be further configured to provide additional functionality to the client's device.

In an embodiment folding the foldable motorized scooter, can be initiated with the front wheel be either locked (in other words, incapable of rolling), or configured to move at a speed that is slower than the speed of the rear wheel, thereby providing the resistance for the folding of the C-shaped member towards the front of the foldable motorized scooter and the hollow arcuate member. The determination whether to lock the front wheel can be, for example, be done by the user, while the distance traveled by the user when the front wheel remains unlocked, can be fixed and determine in turn the rate of folding. Lateral extension of the front and rear wheels' axle assemblies can begin prior, during, or after initiation of arcs folding, at any point along the longitudinal axis, so long as the rear wheel can clear the front wheel. Determining when to initiate the lateral extension of the front and rear wheels' axle assemblies can be done automatically by the CPU of the foldable motorized scooter, and depend on, for example, the wheels' diameter, the friction coefficient between the rear wheel and the ground, the weight of the foldable motorized scooter, the distance to complete the folding progression, the scooter's velocity, or a combination of factors comprising one or more of the foregoing. Initiating the lateral extension of the front and rear wheels' axle assemblies can impose a yaw rotation on the foldable motorized scooter, of between about 0° and 30° (see e.g., FIG. 7). The direction of Yaw can be predetermined by determining the side on which the rear wheel axle assembly will be coupled to the rear wheel. Accordingly, connecting the rear wheel axle assembly to the right side of the rear wheel will impose Yaw to the left, and conversely, connecting the rear wheel axle assembly to the left side of the rear wheel will impose Yaw to the right. Accordingly the motorized scooter described herein can be customized to left-handed users separately from right-handed users.

In an embodiment, the central processing unit can comprise a computer-readable medium containing an executable algorithm configured to minimize the yaw rotation of the foldable motorized scooter based on the aforementioned factors.

The rear axle assembly can be hingedly coupleable to the C-shaped whereby the hinge member element can provide some shock absorbing capabilities and may be for example a torsion hinge equipped with biasing means, or in another embodiment, a one-way torque stay, biasing the rear wheel towards the ground. During the initiation of folding, the hinge element can be locked or have some degree of rotation. When rear hinge element is locked, in an embodiment, the arcuate C-shaped member can traverse the length of the arcuate hollow member above the upper locking point on the hollow arcuate member and then recede to the upper locking point once the rear wheel reaches its final concentrically parallel position with the front wheel. In other embodiments, it would be advantageous for the arcuate C-shaped member not to travel beyond the upper locking point. This could be achieved, for example, by providing some rolling rotation (in other words rotation along the X axis of an orthogonal coordinates system), such that the rear axle assembly will become continuous with the arcuate C-shaped member and rotate with the folding progression to the final concentrically parallel position with the front wheel. In another example, the same (in other words, ensuring the arcuate C-shaped member does not travel beyond the upper locking point) can be achieved with a locked rear hinge element and a rocker bar operably coupled to the rear wheel, which can be configured to allow the rear wheel's central axle to travel up and down along a defined path using the proper actuators. Accordingly and in an embodiment, the rear wheels axle assembly and the rear hinge element are configured to allow the arcuate C-shaped member to travel to a predetermined upper locking point and not beyond, upon folding of the motorized scooter described herein. Conversely, and in another embodiment, the rear wheels axle assembly and the rear hinge element are configured to allow the arcuate C-shaped member to travel beyond a predetermined upper locking point and return to the upper locking point upon folding of the motorized scooter described herein.

A more complete understanding of the components, processes, and motorized, foldable scooters disclosed herein can be obtained by reference to the accompanying drawings. These figures (also referred to herein as "FIG.") are merely schematic representations based on convenience and the ease of demonstrating the presently disclosed foldable, motorized scooters, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2A:
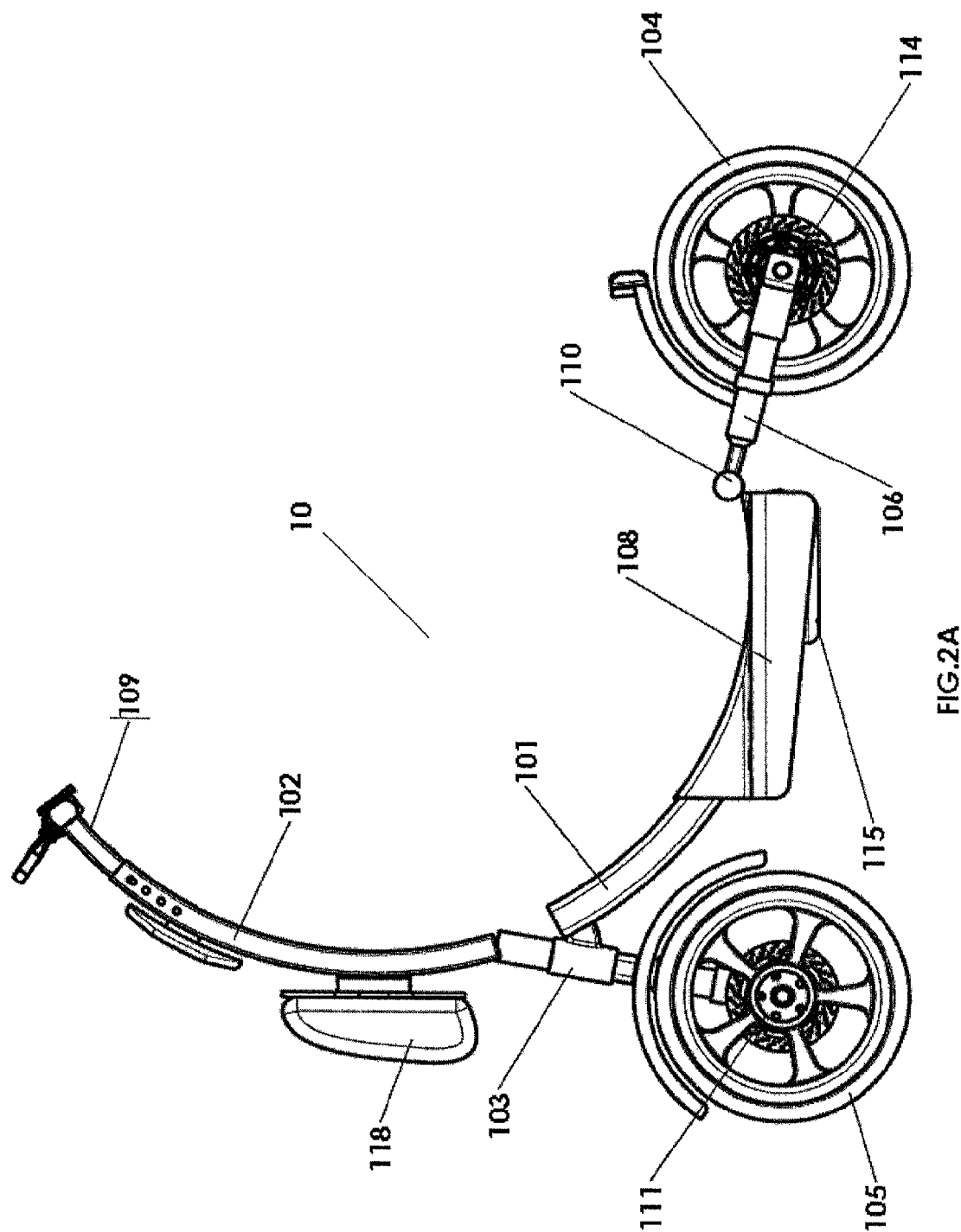
FIG. 2A shows a side view, with front view in FIG. 2B and front perspective view in FIG. 2C an embodiment of the foldable motorized scooter in its extended, operational and rideable position.
Figure 2C:
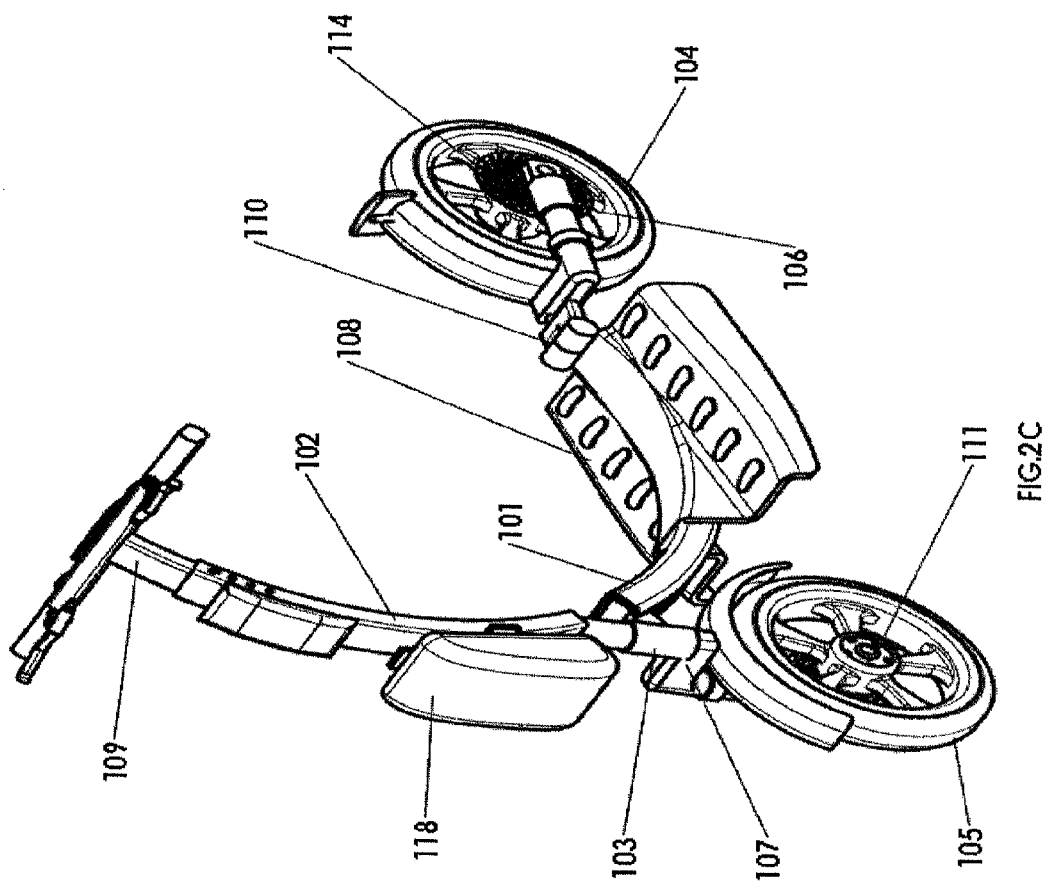
Figure 2B:
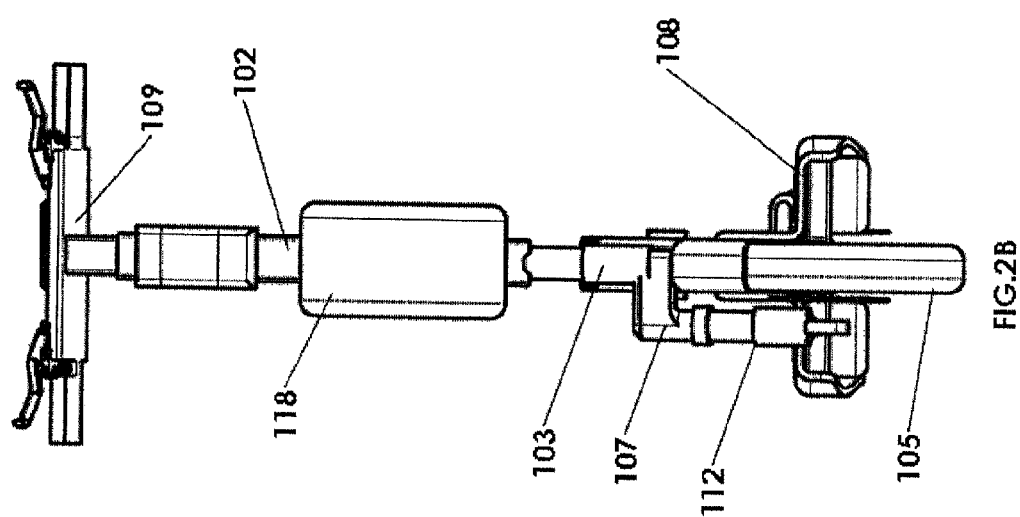
Figure 3B:
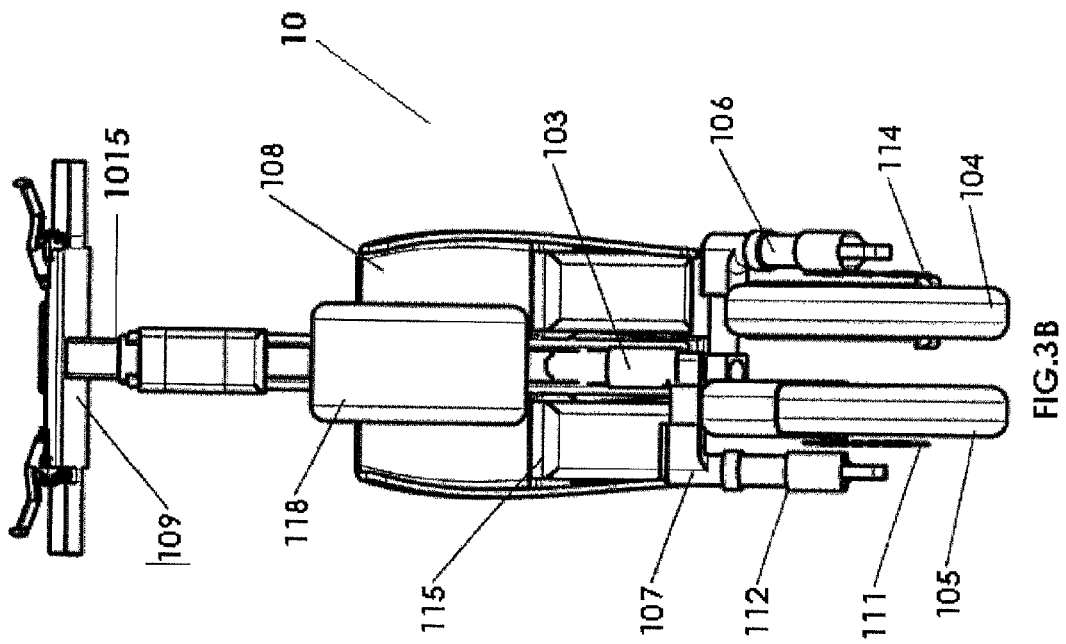
FIG. 3A shows a side view, with front view in FIG. 3B, top view in FIG. 3C and a front perspective view in FIG. 3D of an embodiment of the foldable motorized scooter in its folded stowed position.
Figure 3A:
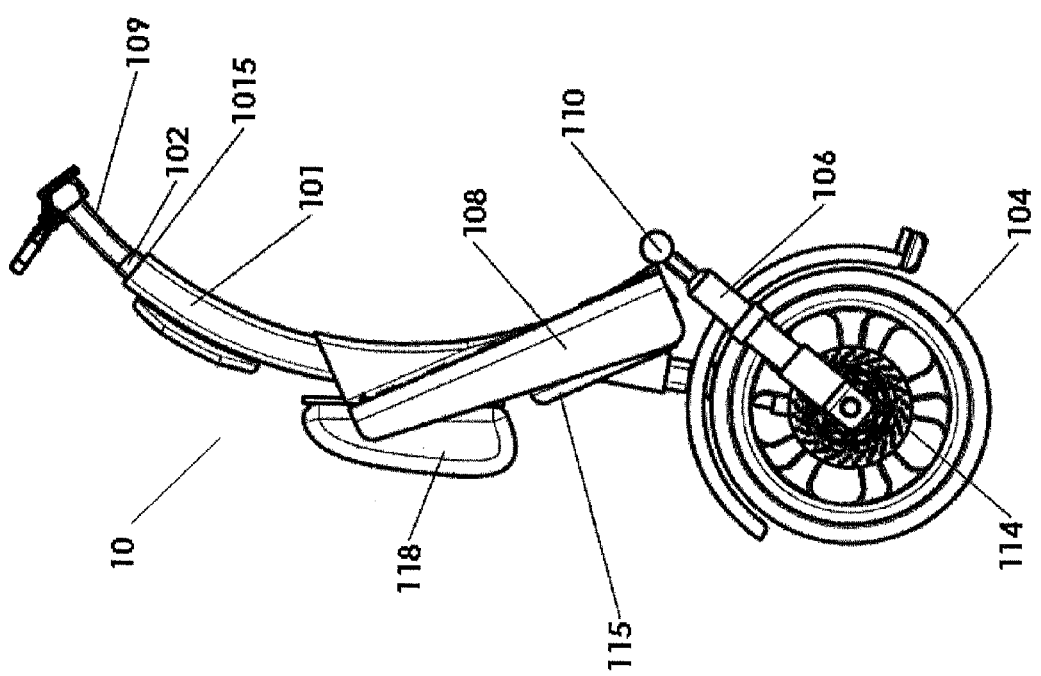

Turning now to FIG. 1 and, showing front exploded view (FIG. 1A) and rear exploded view (FIG. 1B), of foldable motorized scooter 10 in its extended position, having a C-shaped arcuate beam 101, having an open proximal end and a distal end connected to hinging element 110. Hinge element 110 can provide some shock absorbing capabilities and may be for example a torsion hinge equipped with biasing means, (or in another embodiment, a one-way torque stay), biasing rear wheel 104 towards the ground. In addition, hinge element 110 (e.g., a torsion hinge) can be configured to include a rotating actuator (not shown). Hinge element 110 is connected to the proximal end of rear axle assembly 106, comprising shock absorber 112 (FIG. 1B, shown for front wheel). C-shaped arcuate beam member 101 can further have cross bars disposed thereon and used to receive controller (not shown) and/or batteries 115. Arcuate hollow member 102 is illustrated having an open proximal end configured to receive T-shaped handlebar arcuate leg 109. Distal end of arcuate hollow member 102 terminates in an axle pole 116, configured to be inserted into a front axle receiving shell of linking member 103 and be operably couplable to front wheel axle assembly 107, further comprising a flared guiding knob 1032 shown in FIGS. 1A and 1B. The flared guiding knob 1032 is configured to slidably engage C-shaped arcuate beam member 101 and can be coated for example with PTFE (poly(tetrafluoroethylene)) or with appropriate lubricant and other self-lubricating polymers. Guiding knob 1032 is angled to facilitate the sliding, translation and retention of C-shaped arcuate beam member 101 forward towards the front wheel over the arcuate hollow member 102. As shown in FIG. 3A, once the vehicle 10 is folded in folded position, arcuate hollow member 102 and arcuate leg of T-shaped handlebar 109 are nested in the interior of C-shaped arcuate member 101. Front wheel 105 comprises front break 111, coupled to front wheel axle assembly 107, further comprising hub motor 114 (shown for rear wheel 104, e.g. FIGS. 1B, 2C, 3D). Also shown in FIG. 1A, is footboard 108, mud guards 117, storage pouch 118, brakes and throttle 119, and docking point 120. Also shown is back reflector (not numbered). C-shaped arcuate beam member 101 can further comprise a kickstand associated therewith (not shown), extendable to provide a support point to foldable motorized scooter 10.

Figure 3D:
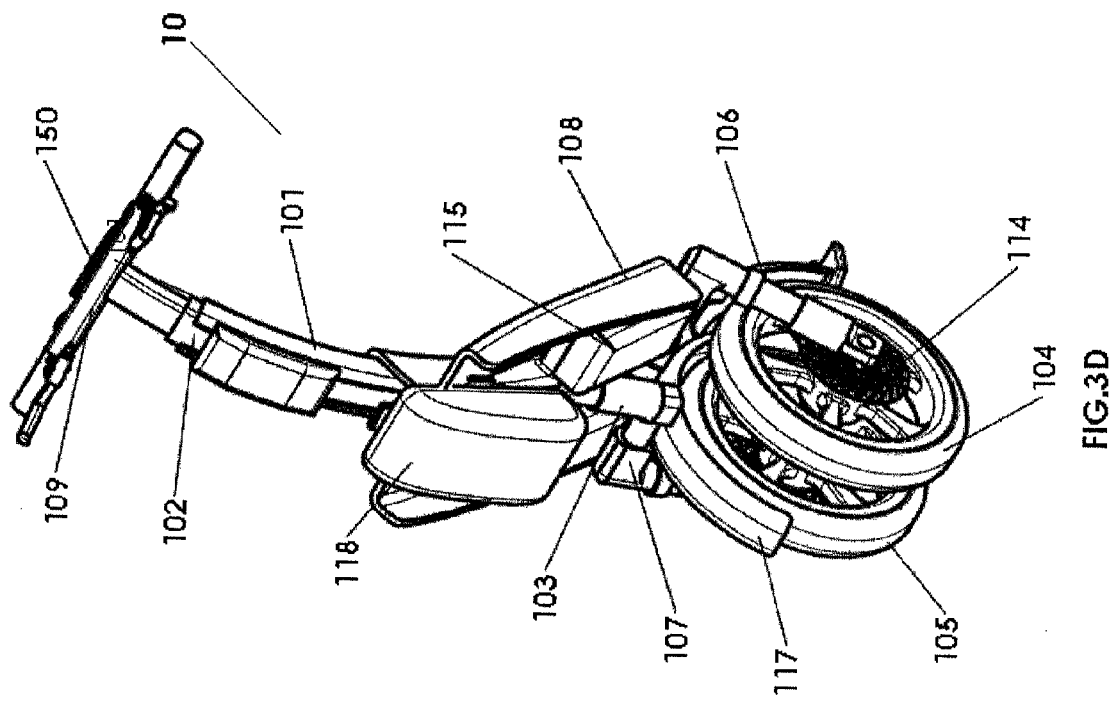
Figure 3C:
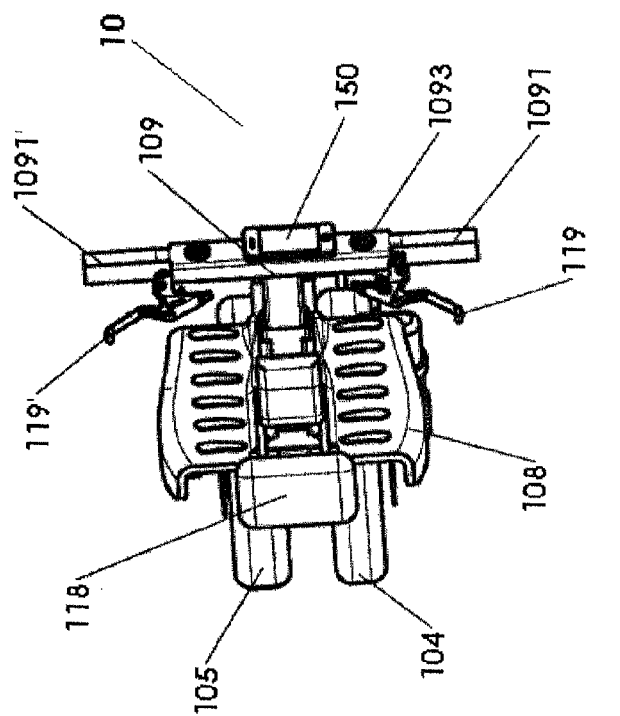
Figure 4C:
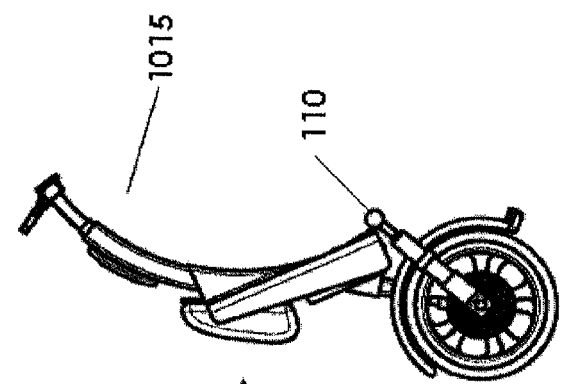
FIG. 4A, is a schematic illustration of the position-s of the foldable scooter along the folding path in the beginning, mid-way in FIG. 4B and at the end in FIG. 4C, depicting arcuate members and parallel positioning of the wheels at the end of the folding progression.
Figure 4B:
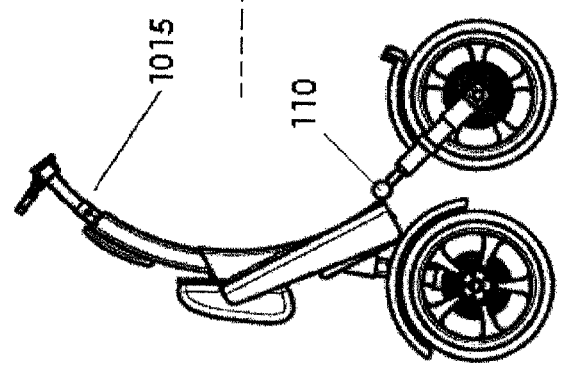
Figure 4A:
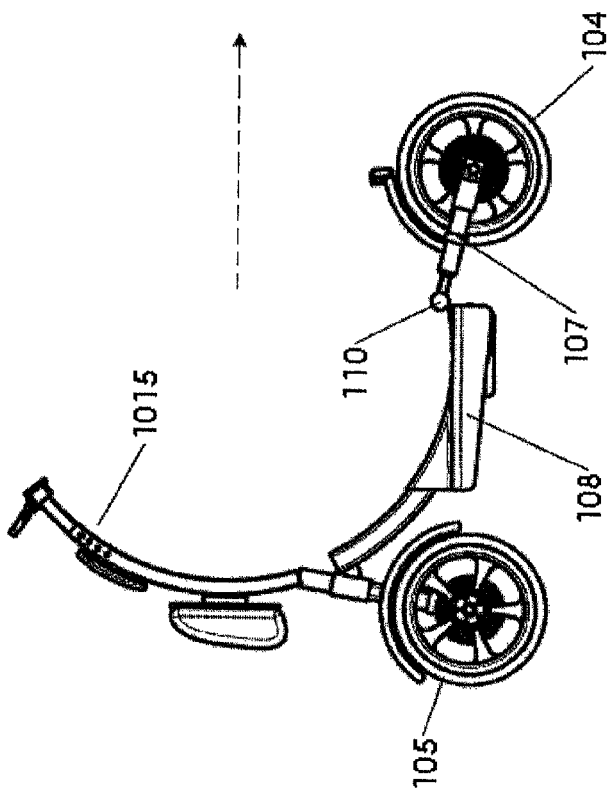

Turning now to FIGS. 3 and 4, showing foldable motorized scooter 10 in its folded position (FIGS. 3A-3D) and while folding (FIG. 4A-4C). As illustrated in FIG. 3A, arcuate hollow member 102 and arcuate leg of T-shaped handlebar 109 are nested in C-shaped arcuate member 101, having a predetermined upper locking point 1015, while rear wheel 104, relieved in an embodiment of the tension due to the load on the rear wheel, is tilted forward by hinge element 110 and is disposed in parallel concentric separation to front wheel 105 (FIG. 3B). Footboard 108 is likewise slanted forward, presenting batteries 115 such that the battery charging contacts (not shown) are exposed and can readily couple to the docking station-scooter interface (SSI, see e.g., FIG. 9A). As shown in FIG. 3B, telescopic cross bars of side axle assemblies 106 and 107 (see e.g., elements 1062 and 1072 in FIGS. 5A and 6A respectively) are extended in the folded position using for example, linear actuators. The linear actuators are configured to provide a stroke of between about 50 mm to about 125 mm, specifically, between about 75 mm and about 100 mm at about 40 kilograms force (kgf) to about 80 kgf (or 800 Newtons) thrust. In its folded position, foldable motorized scooter 10 can have a height of about 80 cm to about 120 cm, width of about 40 cm to about 60 cm and depth of about 30 cm to about 70 cm.

Turning now to FIGS. 4-6, showing foldable motorized scooter 10 in its extended position (FIG. 4A). As shown, in the rideable extended position (FIG. 4A), foot board 108 and rear hinge element 110 define angle θ, which would change along the folding progression by about ±70°. As shown in FIG. 5A front wheel axle assembly 107 having telescopically actuated cross bar 1072 in its relaxed and retracted position, where (FIG. 4A) rear wheel 104 and front wheel 105 are aligned and disposed in the same plane, one behind the other. Upon initiating the powered automatic folding mechanism (in other words, without operator involvement) by command to fold the vehicle 10, C-shaped arcuate beam 101 will slidably translate forward along the angled guiding knob of linking element 103 and engage hollow arcuate beam member 102 (FIG. 4B), at which point the telescopically actuated cross bar 1072 of front wheel axle assembly (107, FIG. 5A) will start to laterally extend via, for example the linear actuator, left of the wheel of the vehicle 10, alignment line defined between the wheel centers in the extended position (FIG. 5B). At the end of the folding process, when arcuate hollow member 102 and arcuate leg of T-shaped handlebar 109 are fully nested in C-shaped arcuate member 101, the telescopically actuated cross bar 1072 of front wheel axle assembly (107, FIG. 5C) will extend to its fullest via, for example the liner actuator, moving the wheel as far laterally left and away from the alignment line in the extended position (FIG. 5C). As shown in FIG. 3D, at this position, wheels 104 and 105 are parallel and concentric to each other, and each wheel is disposed in one of two parallel planes. Front break 111 (FIG. 3B) can be operational in the folded position, thus allowing relatively effortless manual maneuvering and control of the folded scooter, for example to enter into public transportation such as trains, busses, taxis and the like. Additionally, Front break 111 (FIG. 3B) can be operational in the folded position, to facilitate relatively effortless manual maneuvering of the folded scooter onto the docking station 20 (FIG. 9A, 9B).

Turning now to FIG. 6, illustrating an embodiment of rear wheel axle assembly 106 progression along the folding sequence when rear binge element 110 (see e.g., FIG. 4A) remains locked and arcuate C-shaped member 101 slidably translate along arcuate hollow member 102 (see e.g., FIG. 1A) up to upper locking point 1015 (see e.g., FIG. 3A). As shown in FIG. 6A, a cross section of rocker element 1063, in the extended rideable position, extendable cross bar 1062 is in its relaxed position (see e.g., FIG. 5A) and upper telescopic member 1066 is fully extended in channel 1065, comprising lower telescopic element 1067. Upon initiation of folding illustrated at its apogee in FIG. 6B, upper telescopic element 1066 enters lower telescopic element 1067, allowing extendable cross bar 1062 to remain at the same height relative to the ground while rocker element 1063 moves up relative to extendable cross bar, as now, potentially laterally extended cross bar 1062. Upon completion of the folding progression, rocker bar 1063 moves again, extending upper telescopic member 1066 from lower telescopic member 1067 in channel 1065, again allowing extendable cross bar 1062 to remain at the same height relative to the ground while rear wheel 104 comes to rest in concentric parallel with front wheel 105.

Figure 8:
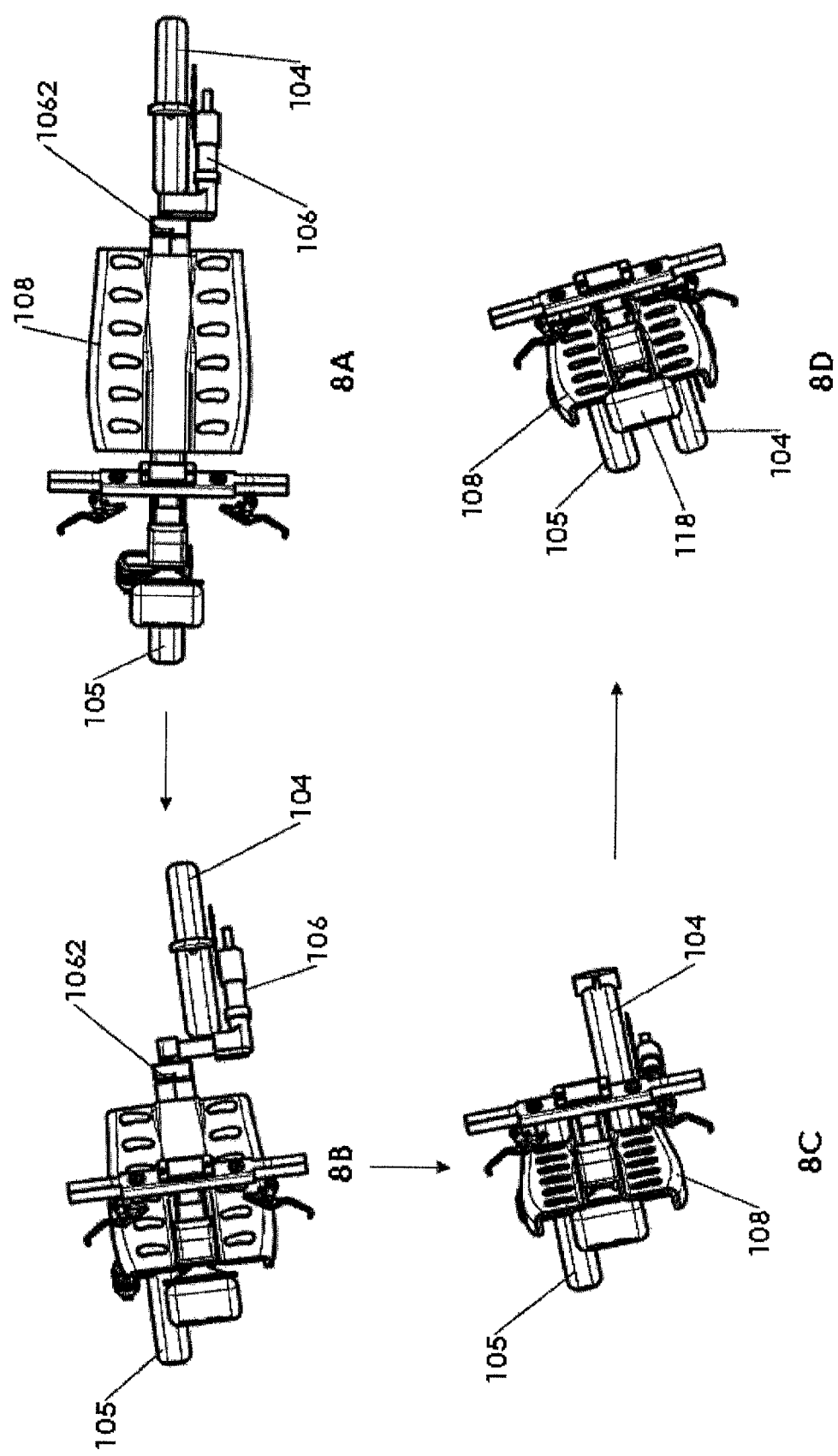
FIG. 8A, is an illustration of the scooter's rotation during lateral axle extension through the folding progression, in an embodiment where initiation of lateral extension of the front wheel and rear wheel axle assemblies occurs folding occurs after arcuate members' began, showing scooter position upon arcuate members' folding initiation, initiation of lateral extension in FIG. 8B, midway through in FIG. 8C and finally parallel positioning of the wheels in FIG. 8D.

Turning now to FIGS. 7 and 8, illustrating in FIG. 7, a schematic showing the yaw rotation (in other words, rotation around the z-axis of an orthogonal coordinate system) experienced by the motorized foldable scooter upon initiation of the lateral extension of the cross bar in the front wheel and rear wheel axle assemblies. As illustrated, for wheel base x, initiating the lateral extension will cause the scooter to yaw at an angle α depending on when the extension commences. The later the initiation of the lateral extension of the cross bar in the front wheel and rear wheel axle assemblies, the more acute is the yaw angle α. As described hereinabove, lateral extension of the front and rear wheels' axle assemblies can begin at any point, so long as the rear wheel can clear the front wheel. Determining when to initiate the lateral extension of the front and rear wheels' axle assemblies can be done automatically by the CPU of the foldable motorized scooter, and depend on, for example, the wheels' diameter, the friction coefficient between the rear wheel and the ground, the weight of the foldable motorized scooter, the distance to complete the folding progression, the scooter's velocity, or a combination of factors comprising one or more of the foregoing. The yaw angle α can be no more than about 30° in an embodiment.

Accordingly, yaw angle $\alpha_1$ can be for example 5° when lateral extension of the front and rear wheels' axle assemblies is initiated simultaneously with the folding of arcuate C-shaped member 101 (not shown) due to friction of the rear and front wheels, while front wheel 105 (not shown) is locked, while yaw angle $\alpha_2$ can be greater than a1, for example 15° when lateral extension of the front and rear wheels' axle assemblies is initiated at a later point along wheel base x' with the folding of arcuate C-shaped member 101, while front wheel 105 (not shown) is locked, and finally yaw angle $\alpha_3$ can be greater than $\alpha_2$, for example 25° when lateral extension of the front and rear wheels' axle assemblies is initiated at a later point along wheel base x" with the folding of arcuate C-shaped member 101, while front wheel 105 (not shown) is locked.

Alternatively, as shown in FIG. 8, front wheel 105 can be rotated at a velocity $v_f$ that is lower than rear wheel 104 velocity $v_r$ (e.g., $(v_f/v_r)<1$), thus providing the resistance for the folding progression. The ratio in velocities between front wheel 105 and rear wheel 104 (see e.g., FIG. 8A), can be configured to provide a predetermined distance, for example, between about 4 m and about 5 m, in which foldable motorized scooter 10 completes the transition from an extended rideable position (FIG. 8A), to a folded stowed position (FIG. 8D), and depend, for example on the average distance to reach a train platform from an entry point and other similarly practical consideration that can be determined and implemented by the end user. As shown, the initiation of lateral extension of the cross bar 1062 (FIG. 8B) will cause the scooter to yaw while folding has started (at FIG. 8A) and automatically progress through stage 8C, to final position illustrated in FIG. 8D, with front wheel 105 and rear wheel 104 in concentric parallel planes.

Figure 9:
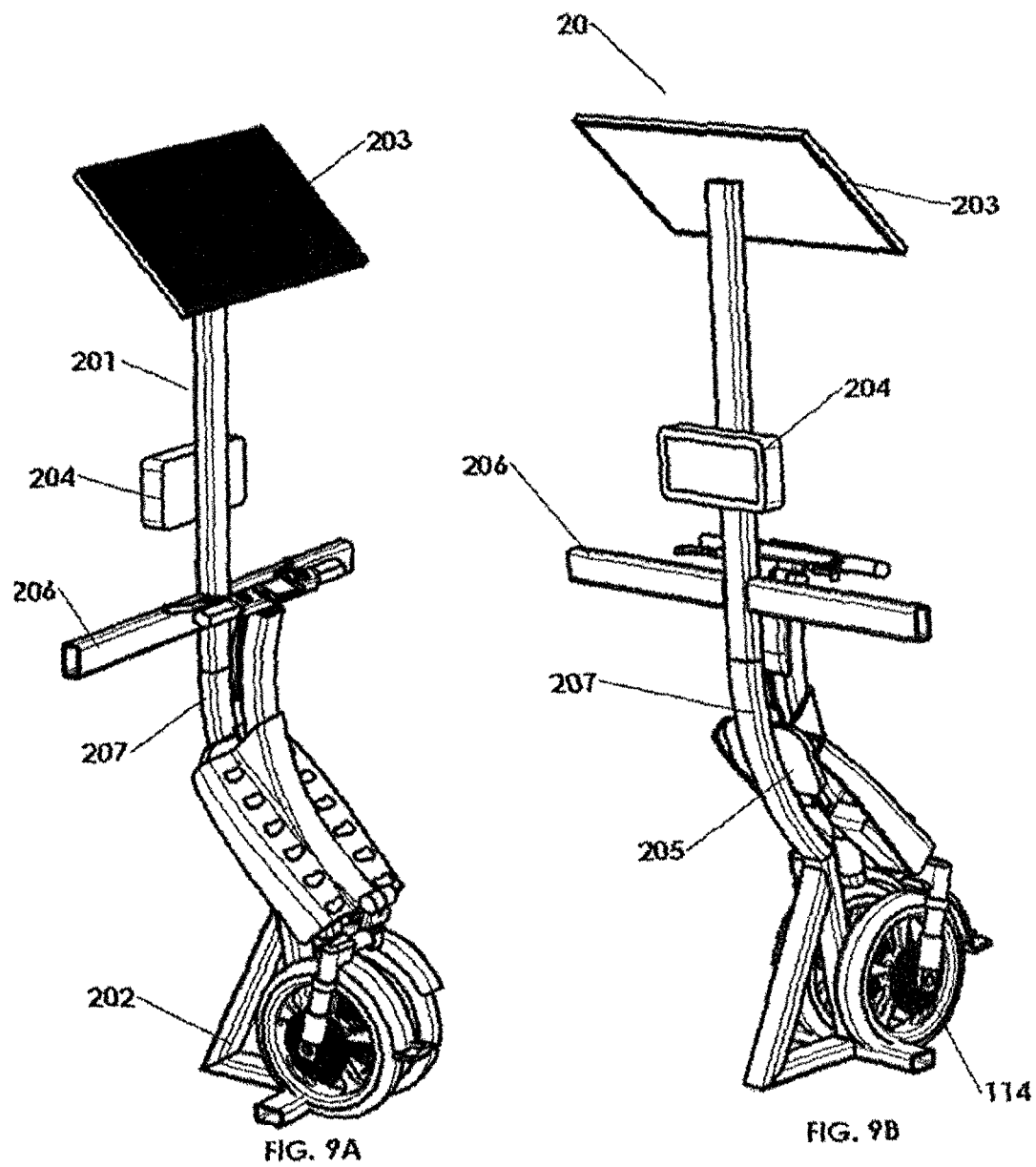
FIG. 9A, shows a front perspective and rear perspective in FIG. 9B of an embodiment of the docking station used to charge the foldable motorized scooter described.

Turning now to FIG. 9, showing docking station 20 from the front (FIG. 9A) perspective and rear perspective (FIG. 9B). As shown in FIG. 9A, docking station 20 comprises base 202 configured to anchor foldable motorized scooter 10, base 202 is connected to vertical member 201, terminating in solar panel 203. Vertical member 201 has a lower arcuate portion 207 with an arc that is about the same radius as the arc defined by arcuate hollow member 102 and arcuate leg of T-shaped handlebar 109 that are nested in C-shaped arcuate member 101. Docking station—scooter interface (SSI) interfaces docking station 20 and foldable motorized scooter 10, and may include electromagnetic contact points configured to align and engage with charging ports in rechargeable, interchangeable batteries 115 (See FIG. 3B), both securing the folded foldable motorized scooter 10 to docking station 20, as well as providing charging points. It should be understood that although docking station 20 is illustrated with solar panel 203 in FIGS. 9A and 9B, other power sources are contemplated. These include any appropriate power source such as underground electric grid and the like, as well as, where appropriate wind turbines. Also shown in FIGS. 9A and 9B is docking station—user interface (SUI), allowing for displaying charge management interface, rental transactions, and the like. Docking station may further comprise a transceiver in wireless communication with a user or a back-end server.

Figure 10:
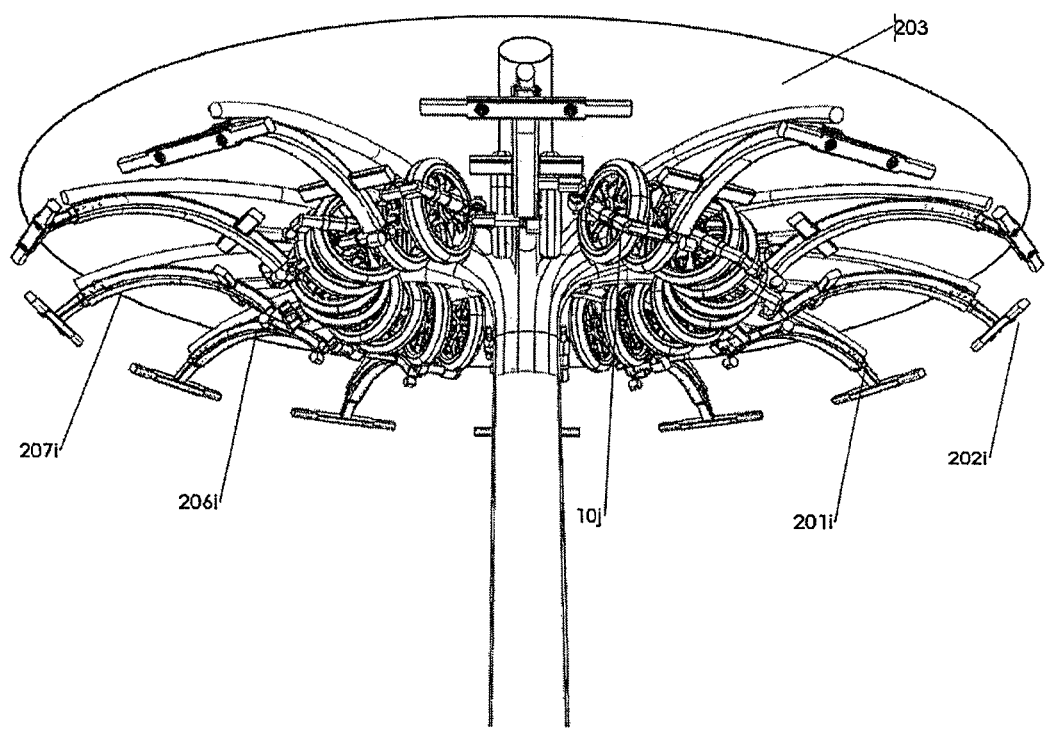
FIG. 10 shows an embodiment of a docking station cluster for a plurality of foldable motorized scooters.

Turning now to FIG. 10, illustrating an embodiment of a docking station comprising a cluster of plurality of base $202_i$ configured to anchor plurality of foldable motorized scooters $10_i$, each base $202_i$ is connected to vertical member $201_i$, terminating in solar panel 203. Each vertical member $201_i$ has a lower arcuate portion $207_i$ with an arc that is about the same radius as the arc defined by arcuate hollow member 102 (See e.g., FIGS. 9A, 1A) and arcuate leg of T-shaped handlebar 109 that are nested in C-shaped arcuate member 101.

There is thus provided a vehicle 10 and a method implementable in a foldable two-wheeled self-powered vehicle having an extended rideable position and a folded rollable, stowed position. The method comprises disposing the two wheels one behind the other in a same plane in the extended position, and disposing the two wheels in concentric parallel disposition in the folded position, with one wheel in one of two parallel planes. The method further permits when desired, to operate the vehicle to respond to command for passing automatically into a selected position, which is either the extended position or the folded position. In other words, a push-button command of a user, not shown, automatically either folds or extends the vehicle 10. Likewise, the method of folding the two-wheeled further comprises a step of maneuvering the vehicle in the stowed (in other words, the folded) position by configuring the non-motorized wheel to rotate freely, while engaging the motorized wheel to power the vehicle.

Likewise, provided herein is a method of transforming a foldable motorized scooter from an extended rideable position to a folded stowed position comprising the steps of: providing a foldable motorized scooter operating between an extended position and a folded position, comprising: an arcuate C-shaped beam member having an open front end and a back end; a rear wheel coupled to a laterally extendable axle assembly only on one side, wherein the axle assembly has a proximal end that is hingedly coupled to the back end of the arcuate C-shaped beam member and a distal end rotatably coupled to the rear wheel; a linking member, comprising a front axle receiving shell coupled to a flared guiding knob, the flared guiding knob slidably coupled to the open front end of the arcuate C-shaped beam member and configured to lock the arcuate C-shaped beam member in the extended position and the folded stowed position; an arcuate hollow beam member, having an open proximal end and a distal end coupled to a proximal end of an axle pole, configured to rotatably couple to the axle receiving shell of the linking member; a front wheel coupled to a laterally extendable axle assembly only on the side opposite the rear wheel, wherein the axle assembly has a proximal end that is hingedly rotatably coupled to the distal end of the axle pole of the arcuate hollow beam member; a T-shaped handle bar, having an arcuate leg configured to be inserted into the open proximal end of the arcuate hollow beam member; and a driver operably coupled to the rear wheel, wherein the arcuate C-shaped beam member is configured to slide over the flared guiding knob of the linking member and around the arcuate hollow beam member; using a command actuator, initiating a folding sequence, wherein the scooter is transformed from the extended position where the two wheels are aligned one behind the other in a same plane, to the folded stowed position, where the two wheels are disposed in concentric parallel, with one wheel in one of two parallel planes.

The folding sequence can be initiated from pressing the appropriate button on the handlebar, which may be equipped with various safety means to ensure that accidental activation of the folding sequence cannot occur, for example, coupling the initiation sequence to a load cell making sure that folding of the vehicle (for example, a scooter) cannot occur when a rider and/or passenger is on the vehicle. Optionally, the rider can initiate the folding sequence while on the scooter when moving at a velocity that is equal to or less than a manufacturer-defined velocity. Likewise, other means can comprise the coupling of the folding mechanism to an accelerometer, making sure that folding cannot be initiated while the vehicle is in motion. These and other means can be incorporated into the vehicle 10 described herein and used in the methods described. The folding sequence initiated can, for example, comprise the steps of: using an integral front brake, optionally locking or, varying the speed of the front wheel such that it is slower than the rear wheel; unlocking the arcuate C-shaped beam member; using the driver, biasing the arcuate C-shaped beam member toward the front wheel and over the arcuate hollow beam member, and laterally extending the front wheel axle assembly and the rear wheel axle assembly; when the front wheel and the rear wheel are parallel and concentric, locking the arcuate C-shaped beam member; and selectively unlocking the front wheel. Moreover, once the wheels are disposed in parallel planes and the arcuate C-shaped beam member is relocked in place, the positional locking mechanism for the T-shaped handlebar can be released and if possible, inserted further into the arcuate hollow beam member. Thus creating the folded stowed position.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The term "coupled", including its various forms such as"operably coupling", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection.

The term "about", when used in the description of the technology and/or claims means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such and may include the end points of any range provided including, for example ±25%, or ±20%, specifically, ±15%, or ±10%, more specifically, ±5% of the indicated value of the disclosed amounts, sizes, formulations, parameters, and other quantities and characteristics.

The term "engage" and various forms thereof, when used with reference to retention of a tool attachment, refer to the application of any forces that tend to hold a tool and a tool attachment together against inadvertent or undesired separating forces (e.g., such as may be introduced during use of the tool). It is to be understood, however, that engagement does not in all cases require an interlocking connection that is maintained against every conceivable type or magnitude of separating force.

The term "selectively unlocking" as used herein refers in an embodiment, to circumstances where the action of unlocking is a choice that would not necessarily affect the overall result.

In an embodiment, provided herein is a foldable motorized scooter having at least one front wheel and at least one rear wheel, configured to operate between an extended rideable position where the front wheel and the rear wheel are aligned along a longitudinal axis, and a folded stowed position wherein the at least one front wheel and the at least one rear wheel are concentrically parallel to each other along a transverse axis, the foldable motorized scooter (i) comprising: an arcuate C-shaped beam member having an open front end and a back end; a rear wheel coupled to a rear axle assembly on one side only, wherein the rear axle assembly has a proximal end that is hingedly coupled to the back end of the arcuate C-shaped beam member and has a distal end rotatably coupled to the rear wheel; a linking member, comprising a front axle receiving shell coupled to a flared guiding knob, the flared guiding knob being slidably coupled to the open front end of the arcuate C-shaped beam member; an arcuate hollow beam member, having an open proximal end and a distal end coupled to a proximal end of an axle pole, the arcuate hollow beam member configured to be rotatably coupled to the front axle receiving shell of the linking member; a front wheel coupled to a front axle assembly only on the side opposite the rear wheel, wherein the front axle assembly has a proximal end that is hingedly rotatably coupled to the distal end of the axle pole of the arcuate hollow beam member; a T-shaped handle bar, having an arcuate leg configured to be inserted into the open proximal end of the arcuate hollow beam member; and a driver operably coupled to the front wheel, the rear wheel, or both wheels, wherein the arcuate C-shaped beam member is configured to slide over the flared guiding base of the linking member and around the arcuate hollow beam member, wherein (ii) the rear wheel axle assembly and the front wheel axle assembly, each comprises a telescopically extendable cross bar configured to operate between an extended position and a retracted position, optionally coupled perpendicularly to a shock absorber, wherein (iii) each cross bar is further coupled to an actuator configured to extend or retract the telescopically extendable cross bar, wherein the foldable motorized scooter (iv) further comprising a foot board coupled to the arcuate C-shaped beam member, (v) comprising a power source configured to power the driver, wherein (vi) in the folded stowed position, the front wheel and rear wheels are disposed in concentrically parallel planes to each other, wherein (vii) the T-shaped handle bar is configured to telescopically extends beyond the open proximal end of the arcuate hollow beam member at predetermined intervals, wherein (viii) in the extended position, the arcuate C-shaped beam member, the arcuate hollow beam member, and the arcuate leg of the T-shaped handlebar define an arc of length between about 80 cm and about 200 cm, (ix) and a radius of between about 25 cm and about 70 cm.

In another embodiment, provided herein is a docking station, configured to engage the foldable scooter described hereinabove, comprising a station-scooter interface (SSI), configured to operably couple the scooter, charge the power source of the scooter, and optionally provide data communication, the docking station comprising (x): a base; a vertical member having a bottom portion coupled to the base; a power source in electronic communication with a charging interface; and a station-user interface (SUI), wherein the charging interface in electronic communication with the SSI, is configured to charge a rechargeable power source, wherein (xi) the SSI comprises a magnetic contact capable of engaging the folded scooter, (xii) the SUI further comprises a transceiver, configured to maintain data communication between the SSI and a server, further comprising (xiii) a cross bar, disposed perpendicular to the vertical member and at the same level of the folded scooter's handle bar, configured to enable coupling the docking station to a plurality of docking stations.

In yet another embodiment, provided herein is a method of transforming a scooter from an extended rideable position to a folded stowed position comprising the steps of: providing a foldable motorized scooter, having at least one front wheel and at least one rear wheel, configured to operate between an extended rideable position where the front wheel and the rear wheel are aligned along a longitudinal axis, and a folded stowed position wherein the at least one front wheel and the at least one rear wheel are concentrically parallel to each other along a transverse axis; and initiating a folding sequence, wherein the scooter is automatically transformed from the extended rideable position where the at least two wheels are aligned one behind the other in a same plane, to the folded stowed position, where the at least two wheels are disposed in concentric parallel planes, with at least one wheel in one of two or more parallel planes, resulting in the scooter being in the folded stowed position, (xiv) the method further comprising a step of initiating an unfolding sequence, wherein the scooter is automatically transformed from the folded stowed position wherein the at least two wheels are disposed in concentric parallel, with at least one wheel in one of two or more parallel planes, to the extended rideable position wherein the at least two wheels are aligned one behind the other in a same plane, resulting in the scooter being in the extended rideable position, (xv) the foldable motorized scooter operating between an extended position and a folded position, comprising: an arcuate C-shaped beam member having an open front end and a back end; a rear wheel coupled to a rear axle assembly on one side only, wherein the rear axle assembly has a proximal end that is hingedly coupled to the back end of the arcuate C-shaped beam member and has a distal end rotatably coupled to the rear wheel; a linking member, comprising a front axle receiving shell coupled to a flared guiding knob, the flared guiding knob being slidably coupled to the open front end of the arcuate C-shaped beam member; an arcuate hollow beam member, having an open proximal end and a distal end coupled to a proximal end of an axle pole, the arcuate hollow beam member configured to be rotatably coupled to the front axle receiving shell of the linking member; a front wheel coupled to a front axle assembly only on the side opposite the rear wheel, wherein the front axle assembly has a proximal end that is hingedly rotatably coupled to the distal end of the axle pole of the arcuate hollow beam member; a T-shaped handle bar, having an arcuate leg configured to be inserted into the open proximal end of the arcuate hollow beam member; and a driver operably coupled to the front wheel, the rear wheel, or both wheels, wherein the arcuate C-shaped beam member is configured to slide over the flared guiding base of the linking member and around the arcuate hollow beam member; and initiating a folding sequence, wherein the scooter is transformed from the extended rideable position where the two wheels are aligned one behind the other in a same plane, to the folded stowed position, where the two wheels are disposed in concentric parallel, with one wheel in one of two parallel planes, wherein (xvi) the folding sequence comprises: optionally locking the front wheel, or optionally slowing the front wheel to a velocity slower than the rear wheel; unlocking the arcuate C-shaped beam member; using the driver, biasing the arcuate C-shaped beam member toward the front wheel and over the arcuate hollow beam member; selectively, laterally extending the front wheel axle assembly and the rear wheel axle, terminating with the front wheel and the rear wheel in parallel and concentric; when the front wheel and the rear wheel are parallel and concentric, locking the arcuate C-shaped beam member; and selectively unlocking the front wheel, wherein (xvii) the step of selectively laterally extending the front wheel axle assembly and the rear wheel axle is carried out prior, during, or after the step of biasing the arcuate C-shaped beam member toward the front wheel and over the arcuate hollow beam member.

In yet another embodiment, provided herein is a method for operating a foldable self-powered vehicle at least two-wheeled having an extended rideable position and a folded rollable position, the method comprising the steps of: disposing the at least two wheels one behind the other in a same plane when in the extended position; disposing the at least two wheels in concentric parallel disposition when in the folded position, with at least one wheel in one of at least two parallel planes, and operating the vehicle in response to command for passing automatically into one of the extended position and/or the folded position, wherein (xviii) the vehicle is an electrically powered scooter operable for maneuvering and controlling as a hand driven cart when disposed in the folded stowed position, and wherein (xix) the vehicle has a first footprint when disposed in the extended rideable position and a second footprint when disposed in the folded stowed position, and the footprint in the folded, stowed position is less than about a third of the footprint in the extended position.

While particular embodiments have been described, alternatives, modifications, variations, improvements, and substantial equivalents that are or may be presently unforeseen may arise to applicants or others skilled in the art. Such modifications can be for example, the miniaturization or scale-up (enlarging) of the scooter described herein, without the substantial change of the (sometimes automated) folding mechanism. Accordingly, the appended claims as filed and as they may be amended, are intended to embrace all such alternatives, modifications variations, improvements, and equivalents.

The invention claimed is:

1. A foldable motorized scooter having at least one front wheel coupled to a front wheel axle assembly on one side only, having a distal end and a proximal end and at least one rear wheel rotatably coupled to the distal end of a rear wheel axle assembly on one side only, having a proximal end and a distal end, the foldable motorized scooter comprising:
   a rear-wheel-coupled arcuate beam member having a back end hingedly coupled to the proximal end of the rear wheel axle assembly;
   a front-wheel-coupled arcuate beam member, having a proximal end and a distal end, configured to be coupled to the front axle assembly; and
   a cross bar coupled to the front wheel axle assembly and a cross bar couple to the rear wheel axle assembly, each cross bar configured to operate between an extended position and a retracted position, wherein the foldable motorized scooter is configured to operate between an extended rideable position where the front wheel and the rear wheel are aligned along a longitudinal axis, and a folded maneuverable position wherein the at least one front wheel and the at least one rear wheel are concentrically parallel to each other along a transverse axis by translating the rear-wheel-coupled arcuate beam member and the front-wheel-coupled arcuate beam member with respect to one another.

2. The foldable motorized scooter of claim 1, further comprising:
   a. a T-shaped handle bar, having an arcuate leg configured to couple to the proximal end of the front-wheel-coupled arcuate beam member; and
   b. a driver operably coupled to the front wheel, the rear wheel, or both front and rear wheels.

3. The foldable scooter of claim 2, wherein each cross bar is telescopically extendable and is further coupled to an actuator configured to extend or retract the telescopically extendable cross bar.

4. The foldable scooter of claim 3, further comprising a foot board coupled to the rear-wheel-coupled arcuate beam member.

5. The foldable scooter of claim 4, further comprising a power source configured to power the driver.

6. The foldable scooter of claim 5, wherein the T-shaped handle bar is configured to telescopically extend beyond the proximal end of the front-wheel-coupled arcuate beam member at predetermined intervals.

7. The foldable scooter of claim 6, wherein, in the extended position, the rear-wheel-coupled arcuate beam member, the front-wheel-coupled arcuate beam member, and the arcuate leg of the T-shaped handlebar define an arc with length of between about 80 cm and about 200 cm.

8. The foldable scooter of claim 7, wherein, the arc has a radius of between about 25 cm and about 70 cm.

* * * * *